United States Patent [19]

Mayers et al.

[11] 3,719,560

[45] March 6, 1973

[54] FUEL ASSEMBLY FOR A NUCLEAR REACTOR USING ZIRCONIUM ALLOY CLAD FUEL RODS

[75] Inventors: Joseph B. Mayers, Greensburg; Stanley Kmonk, Pittsburgh, both of Pa.

[73] Assignee: Westinghouse Electric Corporation, Pittsburgh, Pa.

[22] Filed: April 29, 1969

[21] Appl. No.: 820,107

[52] U.S. Cl. .................................... 176/78, 176/76
[51] Int. Cl. ............................................. G21c 3/34
[58] Field of Search ..................... 176/76, 78, 73, 87

[56] References Cited

UNITED STATES PATENTS

| | | | |
|---|---|---|---|
| 3,380,890 | 4/1968 | Glandin et al. | 176/78 |
| 3,398,053 | 8/1968 | Huber et al. | 176/78 |
| 3,379,617 | 4/1968 | Andrews et al. | 176/78 |
| 3,442,763 | 5/1969 | Chetter et al. | 176/78 |
| 3,029,198 | 4/1962 | Anderson et al. | 176/78 X |
| 2,994,657 | 8/1961 | Petrich | 176/78 X |
| 3,015,616 | 1/1962 | Sturtz et al. | 176/78 |
| 3,128,235 | 4/1964 | Hackney et al. | 176/78 X |
| 3,142,627 | 7/1964 | Emerson | 176/78 |
| 3,228,854 | 1/1966 | Bekkering et al. | 176/78 |

FOREIGN PATENTS OR APPLICATIONS

| | | | |
|---|---|---|---|
| 1,394,187 | 2/1965 | France | 176/78 |

Primary Examiner—Carl D. Quarforth
Assistant Examiner—Gary G. Solyst
Attorney—A. T. Stratton, Z. L. Dermer and J. William Wigert, Jr.

[57] ABSTRACT

Zirconium alloy structural materials for fuel rods are desirable in nuclear fuel assembly construction due to their low neutron absorption cross section properties. However, zirconium alloys are difficult to utilize due to their inability to be welded with other commonly-used fuel assembly construction materials such as inconel or stainless steel and their thermal expansion coefficient, which is significantly smaller than the inconel or stainless steel alloys commonly-used. The latter characteristic may result in buckling of the fuel assembly in a changing thermal environment. To obviate these difficulties in utilizing fuel rod cladding and/or fuel assembly cans of zirconium alloy with other structural elements such as a spacer grid formed from other materials, provisions are made herein for: (1) a fuel assembly construction having a zirconium alloy enclosure including means for attaching structural elements such as nozzles or grids of other materials thereto, and (2) a stainless steel enclosed fuel assembly having zirconium alloy clad fuel rods, including means for permitting relative movement of the fuel assembly parts due to differences in the thermal expansion rates of elements in the fuel assembly.

13 Claims, 12 Drawing Figures

PATENTED MAR 6 1973 3,719,560

FUEL ASSEMBLY FOR A NUCLEAR REACTOR USING ZIRCONIUM ALLOY CLAD FUEL RODS

BACKGROUND OF THE INVENTION

The present invention relates to nuclear reactor fuel assemblies and more particularly to means for utilizing a zirconium alloy as a cladding material for fuel elements in a nuclear reactor fuel assembly, by providing means for securing the fuel elements within the fuel assembly to prevent buckling resulting from unequal thermal expansion of the zirconium alloy and the other materials employed in the nuclear fuel assembly.

A fissionable nuclear reaction, which makes available considerable energy, can result when a fissionable atom captures a neutron having an energy level within a range of energy levels characteristically necessary for enabling fission to occur in the atom. With a suitable disposition of material containing fissionable atoms, a nuclear chain reaction can be sustained, such that, with introduction of limitative or control means, excessive generations of fissions substantially equal each other in number, even though each fission results in the release of two or three or more neutrons. The neutrons which are not employed for propagating the chain reaction either escape the reactive region in which the fissionable material is disposed or are absorbed by fertile, control or other structural materials within the reactor. Of course, if desired, the escaping neutrons can be minimized in number by surrounding the reactive region with a material which characteristically is of high neutron reflective quality.

The chain nuclear reaction can be used for a variety of purposes, such as power generation or irradiation of test specimens. With reference to the former example, the chain reaction provides energy to be harnessed for beneficial use in other forms. For instance, the heterogeneous pressurized reactor has evolved as one type of arrangement for enabling the chain energy to be harnessed for beneficial use.

In the more specific case of the heterogeneous pressurized water reactor, a coolant in the form of water is circulated through the reactive region for the purpose of removing the released energy, in the form of heat, for transfer through a heat exchanger or steam generator elsewhere in the circulatory system to operate a prime moving device, such as a turbine, and ultimately an electrical generator having an output of usable electrical energy.

The reactive region conventionally includes an arrangement of fuel elements or rods, such as an array of encased fuel, formed from uranium dioxide or other fissile material. Once a nuclear reaction is initiated, its propagation as a chain reaction can be enhanced by using a suitable coolant such as water or certain organic materials which additionally serve to moderate or slow down emitted neutrons to fission-producing energy levels. The rate at which fissions occur can be directly controlled by the use of control rods or other members comprised of a neutron-absorbing material, such as hafnium, usually variably insertable within the reactive region or among the fuel elements.

The number of fuel elements which are used to form the reactive region is ordinarily determined by the criticality necessary mass of the fissile material and by other considerations, such as a desired energy output and the allowable thermal character of the region. Conventionally, the fuel elements are formed into bundles or subassemblies, with the subassemblies being assembled or combined to form an overall assembly or reactive region.

In the exemplified pressurized water reactor or, in fact, in most, if not all, neutronic reactors having substantially uniformly enriched cores, the neutron flux density varies within the reactive region as a function of the coordinate position relative to the core structure. This is clearly so, for example, in that certain coordinate positions, such as those located centrally of the reactive or core region, are in greater proximity to a greater number of fissions and, therefore, have a statistically greater probability of being in the path of fission-producing neutrons. In locations in which elevated neutron flux is determined to exist it can also reliably be correlated that the local heat generation of the adjacent fuel elements, in the case of the heterogeneous-type reactor, is relatively elevated because an elevated number of fissions and released energy is associated with the elevated neutron flux.

Thus, with continued reference to the exemplified pressurized water reactor, spaced fuel elements located within the same bundle or subassembly can experience different rates of heat generation and resulting different rises in temperature. Moreover, such factors as flux peaking, described in more detail subsequently, unequal distribution of coolant flow through the core region, presence of adjacent structure material, xenon-tilt and other flux perturbations, also lead to the same effect. Accordingly, spaced fuel elements respond with correspondingly different thermal expansions or contractions so that, unless means are provided for offsetting this thermal effect, the bundle can be subjected to deformation or bowing which in general is undesirable since "hot spots" or regions at extreme temperature rise in the fuel element can then result. An additional undesirable effect arises when peripherally located fuel elements bow to join or obstruct control rod movement.

To alleviate the above-described difficulties, fuel supporting grid structures, having a generally egg-crate configuration and having a plurality of retaining springs located therein, have been provided wherein the fuel rods are not rigidly constrained within the fuel assembly. Individual fuel elements are free to expand longitudinally so as to alleviate these buckling effects. One such grid structure is more thoroughly described in U.S. Pat. No. 3,379,618 issued to Erling Frisch and assigned to the assignee of the present invention.

Prior nuclear fuel rod designs incorporated a thin stainless steel cladding to enclose a plurality of nuclear fuel pellets. It has been found that other cladding materials are more suitable than stainless steel. Alloys of zirconium generally of the type described in U.S. Pat. No. 2,772,964 and commonly referred to as zircaloy, has been found to be a very suitable material for nuclear fuel rod cladding as well as for other applications in nuclear reactors. Such zirconium alloys are attractive as a nuclear reactor construction material because when located within the reactive region it captures very few neutrons, i.e., it is relatively "transparent" to neutrons and, therefore, does not capture and remove as many neutrons from the reactive region as other commonly used materials, such as stainless steel.

The problem of using a zirconium alloy as a fuel element cladding material lies in the great difference in the thermal expansion properties of the cladding in relation to the other materials commonly found in a nuclear fuel assembly, zirconium alloys having a much lower coefficient of thermal expansion than the others. For example, if fuel rods, clad with a zirconium alloy are held within a stainless steel fuel enclosure or can structure, and if no provision is made to allow for movement between the fuel rods and the fuel enclosure structure under elevated temperature conditions, buckling or bowing is likely to occur, possibly resulting in mechanical failure of the thin fuel enclosure or the fuel rods. In present fuel assembly designs where stainless steel is used to clad the fuel elements, the problem of buckling does not occur since the fuel rods and enclosure will expand and contract in a varying thermal environment at the same rate. While the grid springs will permit the relatively small expansions involved in a stainless steel fuel cladding-fuel enclosure arrangement, the grid springs may offer too much resistance to movement resulting from differing rates of thermal expansion when a zirconium alloy is used.

Several approaches have been taken in the past in an effort to utilize zirconium alloys as fuel cladding material. In one design the tensions in the grid springs were reduced, thereby making thermal expansion movement easier. This has not proven to be satisfactory due to local wearing, or fretting, in the vicinity of the grid springs. Another construction has called for the use of a heavy-walled, reusable enclosure also formed from a zirconium alloy. Since both the enclosure and cladding would then be made of the same material, there would be little or no relative thermal expansion. Spacer grids are not made of zirconium alloys for these applications since spring relaxation of such grid springs can occur after irradiation and in high temperature environments. In addition, in a nuclear reactor having an open lattice fuel enclosure design this is not a satisfactory solution. Furthermore, the addition of more material inside of the core structure is both economically unsound and also has parasitic effects on the neutron population in the reactor.

Another difficulty encountered in utilizing zirconium alloys as a cladding material or as an enclosure material is the inability to weld the zirconium alloy to the nickel base alloy such as Inconel alloy 718 fuel grid construction, or to stainless steel.

SUMMARY OF THE INVENTION

In overcoming the difficulties of utilizing zirconium alloys as a cladding material for fuel elements in a nuclear fuel assembly discussed above, two alternative embodiments of the invention are herein provided. In the first embodiment zirconium alloy clad fuel elements are secured within a thin-walled zirconium alloy fuel enclosure. Because of the inability to weld the fuel support grids normally formed from a suitable material such as Inconel alloy 718 to the enclosure structure, novel securing means are provided to overcome this difficulty. In a second embodiment a thin-walled stainless steel fuel enclosure is used in conjunction with zirconium alloy clad fuel elements. To overcome the buckling problem two novel grids are provided; one grid to support the fuel elements and one grid to give structural rigidity to the stainless steel enclosure structure.

It is therefore an object of the invention to provide a novel means for incorporating thin-walled fuel elements having a zirconium alloy cladding in a nuclear reactor fuel assembly.

It is further an object of the invention to provide a fuel assembly in a nuclear reactor having a thin-walled stainless steel fuel enclosure wherein means are provided to provide relative thermal expansion between the zirconium alloy clad fuel elements and a stainless steel enclosure.

Another object of the invention is to provide a novel means in a nuclear fuel assembly for securing a fuel support grid formed from a nickel-base alloy to a zirconium alloy enclosure structure.

Another object of the invention is to provide novel means for securing zirconium alloy materials to non-zirconium alloy materials within a nuclear fuel assembly.

Another object of the invention is to provide novel means of supporting zirconium alloy clad fuel rods within a stainless steel enclosure wherein relative thermal expansion between the fuel rods and the enclosure is permitted.

Another object of the invention is to provide a fuel assembly in a nuclear reactor having zirconium alloy fuel elements, wherein the fuel rod supporting members do not cause significant wear upon the fuel cladding because of movement resulting from thermal expansion.

DESCRIPTION OF THE INVENTION

Figures 1, 3, 6, 7:
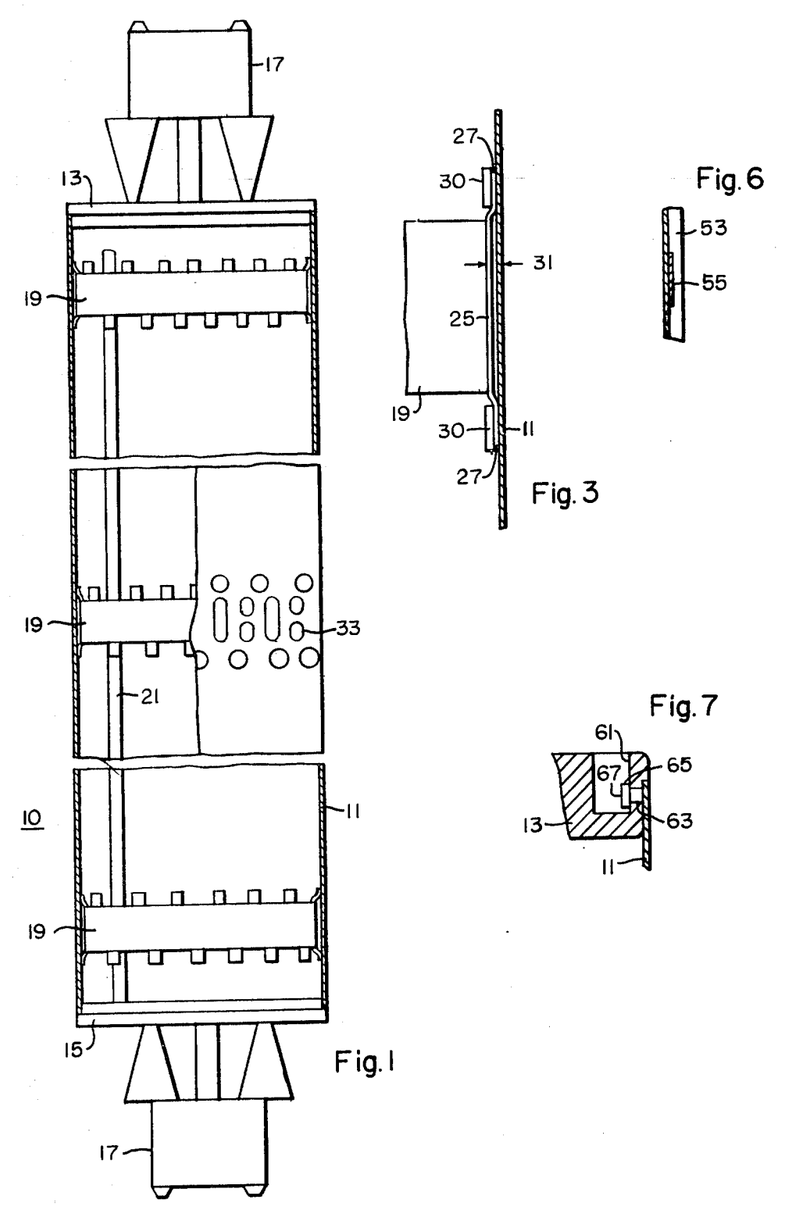
FIG. 1 is a front elevational view, partially in section and having a certain portions removed for clarity, of one embodiment of a fuel element for a nuclear reactor arrangement constructed in accordance with the principles of the invention.
FIG. 3 is an enlarged fragmentary view of a portion of the fuel assembly wall shown in FIG. 1.
FIG. 6 is an enlarged fragmentary view of another portion of the wall shown in FIG. 1.
FIG. 7 is an enlarged fragmentary view showing means for securing the top nozzle plate to the fuel enclosure.

FIG. 1 shows a nuclear fuel assembly 10 having a thin-walled fuel enclosure or can structure 11 desirably formed from a zirconium alloy. A zirconium alloy is used because it provides effective resistance to corrosion, suitable structural qualities, and a low neutron absorption cross-section. The enclosure has many perforations throughout its surface to allow circulation of a coolant throughout the reactive region. The enclosed structure 11 is bounded at its upper end by a top nozzle plate 13 and at its lower end by a bottom nozzle plate 15 both of which are desirably formed from stainless steel. End nozzles or mounting members 17 are located at the ends of the enclosure structure and are attached to the top and bottom end plates 13 and 15. The means for mounting the stainless steel plates to the enclosure 11 will be described in more detail subsequently.

Figure 2:
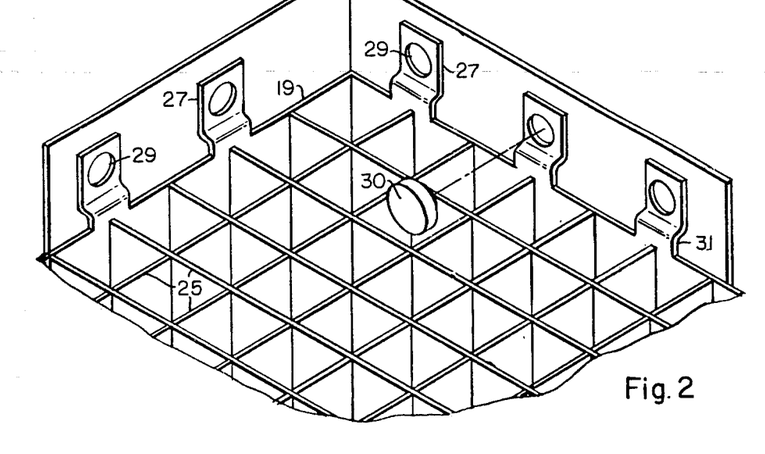
FIG. 2 is an enlarged perspective view of the fuel assembly shown in FIG. 1 showing a portion of the grid construction located therein.

Located within the enclosure 11 is a plurality of fuel rod supporting grid structures 19. These grid structures are made up of a plurality of thin bands arranged in a lattice configuration desirably formed from a suitable nickel base alloy such as Inconel alloy 718 or from a suitable iron base alloy commonly known as a stainless steel. Inconel alloys are used for fuel support grids because of their good mechanical properties as a result of its ability to be age-hardened after brazing. Inconel alloys have a co-efficient of thermal expansion somewhat lower than that of stainless steel but not so low as zirconium alloys. Like stainless steel, Inconel alloys cannot be welded satisfactorily to zirconium alloys. A plurality of fuel rods 21, containing nuclear fuel pellets, are inserted through the grids. The fuel elements 21 are provided with a thin cladding of a zirconium alloy. The fuel elements are held in a fixed relationship by a plurality of finger-like spring projections (not shown) along the inner faces of the grid lattice 25 (FIG. 2). The construction and arrangement of the grid springs are described in more detail in U.S. Pat. No. 3,379,618 issued to Frisch and assigned to the assignee of the present invention.

Novel means are provided in FIG. 2 for attaching the grid assembly 19 to the enclosure 11. Located periodically about the outer periphery of the grid lattice 25 are a plurality of mounting tabs 27 having holes 29 located therein. In attaching the grid structure 19 to the enclosure 11, flanged weld buttons 30 formed from a zirconium base alloy are inserted through the holes 29 of the grid tabs 27. The weld buttons are spot welded to the enclosure structure. The flanged portion of the weld buttons 30 holds the grid tabs in a fixed relationship with the enclosure 11. It can be seen by this arrangement that the grids 19 are mechanically held to the enclosure wall 33.

The relationship between the weld buttons 30 and the enclosure wall 37 can better be understood by reference to FIG. 3. The grid 19 is secured to the enclosure 11 by weld buttons 30 inserted through holes in tabs 27. It should also be noted that the mounting tabs 27 extend beyond the periphery of the grid lattice 25. This offset or space 31, also shown in FIG. 1, has been exaggerated for purposes of illustration. This offset has been provided to allow the Inconel grid 19 to expand radially during periods of high thermal activity, relative to the slower thermal expanding enclosure 11, i.e., the curved shape of the tabs provides a certain degree of resiliency to allow for thermal expansion.

Because the enclosure wall and the cladding of the fuel rods are both formed from a zirconium base alloy, thermal expansion will not cause buckling since both will expand at the same rate under varying temperature conditions. The relatively greater expansion of the grid structure outwardly against the inner wall of the enclosure is alleviated by the offset arrangement of the tabs 27 as previously described and by enclosure expansion relief perforations 33 (FIG. 1) which permits the enclosure 11 to bow outwardly at the grid locations with little probability of damage to the enclosure 11. These holes also provide a means for access for welding the tabs to the inside of the enclosure.

Figure 4:
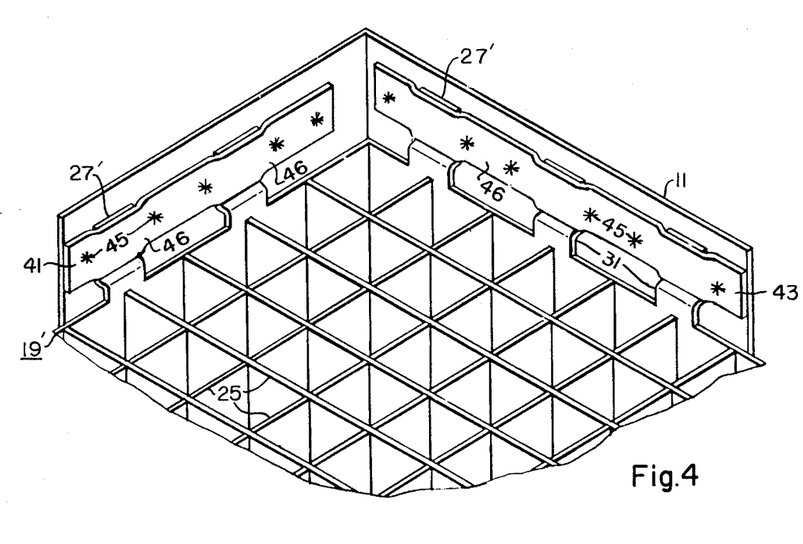
FIG. 4 is an enlarged perspective view of the fuel assembly shown in FIG. 1 showing a portion of an alternative grid construction included therein.

In FIG. 4 an alternative means is provided to secure a grid 19' having a lattice 25' formed from a nickel base alloy to enclosure 11' formed from a zirconium base alloy. Tabs 27' are attached to or form a part of the upper and lower outer peripheries of the grid lattice 25'. Generally thin, mounting straps 41 and 43 formed from a zirconium base alloy are periodically spot welded at points 45. Although not shown, similar straps are also located around lower tabs located at the bottom of the grid periphery. Raised portions 46 provide a receptive area into which the grid tabs 27' may be inserted. Axial expansion of the grid is permitted since the tabs 27' are free to move within the raised portions 46 of straps 41. Offsets 31', and expansion relief perforations 33 (FIG. 1) are provided to permit expansion of the grid assembly 19' relative to the enclosure 11'.

Figure 5:
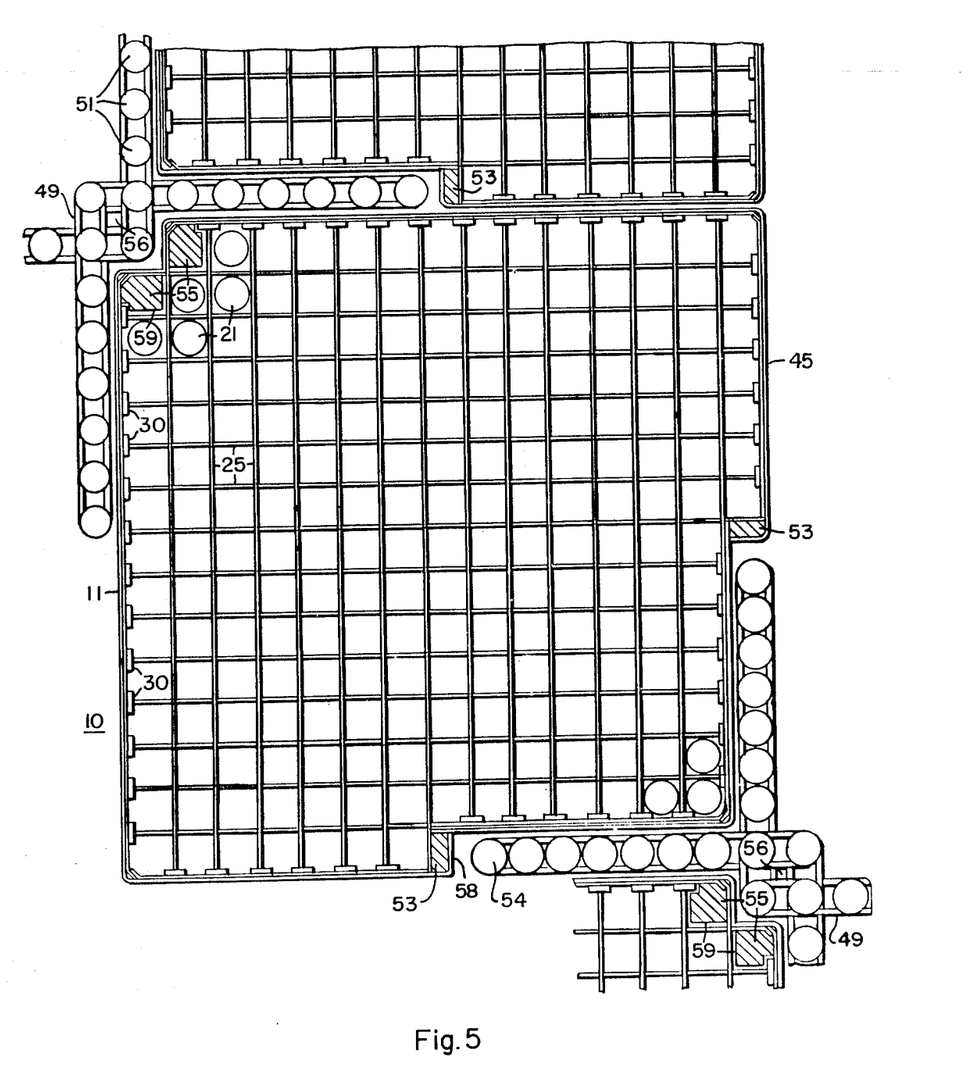
FIG. 5 is a cross-sectional view of a plurality of nuclear reactor fuel assemblies.

FIG. 5 shows a cross-sectional view of a plurality of fuel assemblies which make up a typical nuclear reactor. The grid 19, having a lattice 25, is attached to the zircaloy enclosure 11 by the zircaloy weld button arrangement shown in FIG. 2. The weld buttons 30 are located around the outer periphery of the outermost lattice of the grid assembly. The fuel rods 21 are interspersed between the walls of the lattice 25, and are held in place by grid springs (not shown).

A plurality of fuel assemblies are used within a nuclear reactor. Interspersed between the plurality of fuel subassemblies are cruciformed-shaped control rods 49. These control rods 49 consist of a plurality of generally elongated control elements 51 fabricated from a suitable neutron absorbing material, such as hafnium. The control rods 49 can be lowered in and out of the reactor region to control the rate at which energy is generated. The farther that the control rods are inserted into the reactive region the greater number of neutrons will be adsorbed. Hence the rate of fission will decrease, and the output of the reactor will also decrease. When the control rods are removed from the fuel element region, fewer neutrons will be absorbed, more fission occurs, and the output of the reactor will increase.

An undesirable phenomenon occurs whenever excess water accumulates or wherever there is a water channel present in the reactor core. This phenomenon is called flux peaking. It occurs because of the ability of water to act as a moderator to decrease neutron velocities within the core region. By slowing down the speed of the neutrons, more neutrons are present within the reactive region at any given time and hence the probability of fission occurring is increased. This is undesirable since in these regions local temperatures will increase due to the increased amount of fission. Since a reactor cannot be operated above a predetermined rated temperature, a hot spot resulting from flux peaking may result in the remainder of the reactor operating at a temperature below its rated temperature. This results in a decrease in the efficiency of the reactor.

There are several regions in the reactor wherein it has been determined both deductively and emperically that flux peaking will occur. In particular, flux peaking occurs in the region wherein the control rods enter and leave the nuclear reactor. In these regions the coolant, water, enters or displaces the control rods whenever they are removed from the reactor. It has been found in earlier reactor designs that positioning strips of a suitable structural material such as a zirconium base alloy along the length of the fuel enclosure assembly in strategic points near the control rods tends to reduce flux peaking. Zirconium alloys, unlike water, have little effect on neutron velocities and acts to counterbalance the effect on neutrons caused by excess water in these regions.

Referring now to FIG. 5, a first plurality of generally elongated zirconium alloy bars 53 are positioned vertically near the ends 54 of the control rods 49. Also, a second plurality of generally elongated zirconium alloy bars 55 are located near the centers 56 of the control rods 49. In the past bars 53 and 55 have been placed within generally well-shaped portions 58 and 59, respectively, of the fuel enclosure wall. The bars have been located in these positions solely for the purpose of reducing flux peaking, providing neither support nor rigidity to the enclosure. Since in the present invention, zirconium alloys are used as the enclosure structure material and since the bars 53 and 55 are required in the flux assembly for reducing flux peaking, it is a feature of the present invention to fixedly secure these bars to the fuel enclosure 11 by suitable means such as welding bars 53 and 55 are spot welded to the walls of enclosure 11 thereby providing added rigidity to the entire fuel enclosure and forming an integral part thereof.

Because the bars 53 and 55 run the entire length of the fuel assembly 10, provision must be made to allow for the grid assemblies located within the fuel assembly 10. In FIG. 6, bar 53 is provided with a notch 55. The notch is located along the side of the bar 53 facing the inner surface of the enclosure 11, permitting the bar 53 to overlay the grid lattice 25.

Referring to FIG. 1, both the top and bottom nozzles, 13 and 15, respectively, are desirably constructed of stainless steel. Difficulty arises in securing these nozzle plates to a zirconium base alloy enclosure structure because of the impossibility of welding stainless steel to zirconium alloys. Means for securing the nozzle plates is shown in FIG. 7. Upper nozzle plate 13 is provided with a flange 61 around its circumference. A channel 63 is cut through the flange portion 61. Although only one such channel is shown in FIG. 7, a plurality of channels are provided in practice at various locations around the circumference of the plate 13. A weld button 65 formed from a zirconium alloy having a flange portion 67, is inserted through the channel 63 and spot welded at 69 to the enclosure 11. The lower nozzle plate 15 is mounted identically as nozzle plate 13. Where a raised surface can be tolerated on the outside surface of the enclosure 11, a cold formed stainless steel rivet (not shown) may also be employed for this joint.

Figure 8:
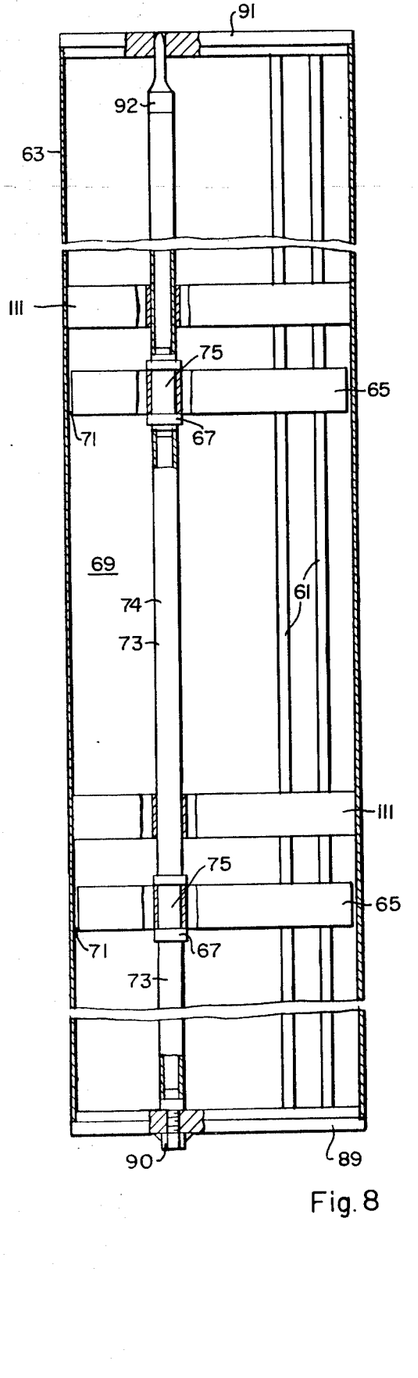
FIG. 8 is a cross-sectional view of a nuclear fuel assembly incorporating another embodiment of the invention.

In the embodiment of this invention of FIG. 8 stainless steel is used as the fuel enclosure material. As discussed earlier, if zirconium alloy clad fuel rods are used with the stainless steel enclosure and if no other provision is made, the fuel enclosure is likely to buckle due to the more rapid expansion of the stainless steel enclosure relative to the zircaloy cladding, in a high temperature environment. This buckling occurs because the stainless steel enclosure is not free to expand vertically relative to the fuel rods.

In accordance with the present invention, two types of grid assemblies are incorporated within each fuel assembly. The first grid assembly type is constructed of a nickel base alloy and is used to support the fuel elements. However, these grids are supported free from the walls of the enclosure, i.e., there is no contact between the fuel support grids and the stainless steel enclosure structure. Spacing of these grids is achieved by fuel-bearing tie rods. During times of thermal expansion the rods are free to expand longitudinally at a different rate than the stainless steel fuel enclosure.

A plurality of second grid structure are provided to give support to the relatively thin-walled stainless steel enclosure. These grids are securely fastened to the walls of the stainless steel enclosure. However, there is no contact between the second grid assembly and the fuel rods. Hence, the latter grids furnish support for the entire fuel assembly but do not provide any support for the fuel rods. The support for the fuel rods is entirely provided by the first grid assemblies. The second grids also desirably are constructed of stainless steel or of a material having similar thermal expansion properties as the enclosure.

Referring now to FIG. 8, a plurality of fuel rods 61 clad with a zirconium alloy cladding are grouped within stainless steel enclosure 63. First grid assembly, fuel support grids 65 formed from a suitable grid material such as Inconel alloy 718 are each secured at 67 to a support tie rod 69 formed with a zirconium alloy cladding. The means for securing the grid 65 will be described in more detail subsequently. The fuel support grid 65 is attached and secured only at 67 and is therefore free from the walls of the enclosure 63. A slight space 71, highly exaggerated is provided between the fuel support grids 65 and the fuel enclosure 63. Space 71 provides for expansion of the grid assembly relative to the enclosure structure at operating temperatures. The lower end portion of each tie rod 69 is mounted to the bottom end plate or nozzle 89 by tie-rod securing means 90. The upper end portion of each tie rod 69 is mounted to top end plate or nozzle 91 by tie-rod securing means 92. Both securing means 90 and 92 will be discussed in more detail subsequently.

Figure 9:
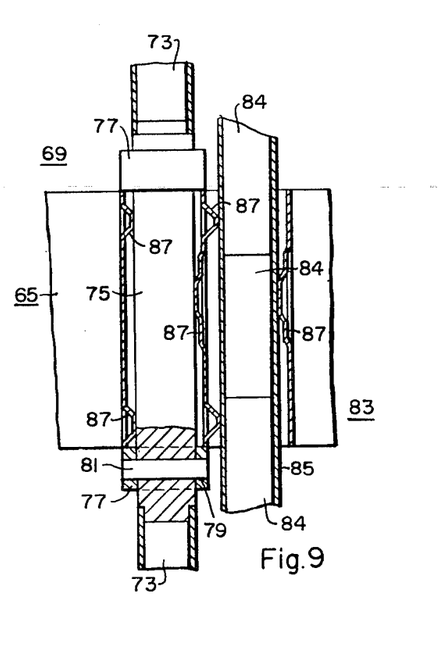
FIG. 9 is an enlarged fragmentary view of means for securing the fuel support grid to the tie rods shown in FIG. 8.

Tie rod 69 is made of short length fuel rods 73 joined together at grid locations by elongated solid end plugs 75. The attachment of fuel support grid 71 to tie rod 69 at 67 can be seen more readily by reference to FIG. 9, showing that portion of the one tie rod 69 which passes through the grid 65. Clad fuel segments 73 located above and below the grid structure are separated by the solid end plug 75. The tie rod 69 is secured to the fuel support grid by suitable means such as by placing a generally cylindrical stainless steel lock ring 77 around the outer circumference of end plug 75 above and below the grid 65. Two channels 79 are provided through the lock pins 77 and the end plug 75. Two stainless steel pins 81 are inserted through these channels and are welded at their ends to the lock ring, both on the upper and lower surfaces of the grid assembly. Also shown in FIG. 9 is a standard fuel rod 83, made up of a plurality of stacked fuel pellets 84, having a zirconium alloy cladding 85. The fuel rod 83 is held in a fixed spatial position by grid spring fingers 87, which allow the fuel rod to move longitudinally relative to the grid 65. While only one tie rod has been shown; it will be appreciated that a plurality of like tie rods 69 are used within each fuel assembly.

Figure 10:
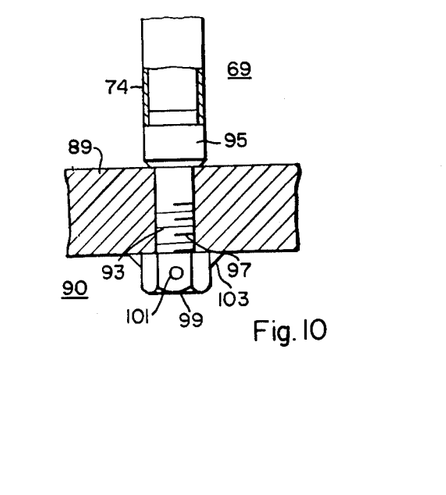
FIG. 10 is an enlarged fragmentary view of the bottom tie rod securing means shown in FIG. 8.

Details of a suitable tie rod securing means 90 are shown in FIG. 10. A hole 93 is provided through bottom nozzle or end plate 89. Tie rod 69, provided with zirconium alloy cladding 74, is fitted with a zirconium end plug 95 having a threaded portion 97 which extends through hole 93 and beyond the bottom of nozzle plate 89. A stainless steel nut 99 is screwed upon the threaded portion 97. A small hole 101 extends through the nut 99 and threaded portion 97 of the zirconium alloy end plug 95. A stainless steel pin 100 is inserted through the hole 101. The ends of the pin 100 are welded to the nut 99 which is tack welded at 103 to the end or nozzle plate 89 to ensure that the joint remains secure.

Figure 11:
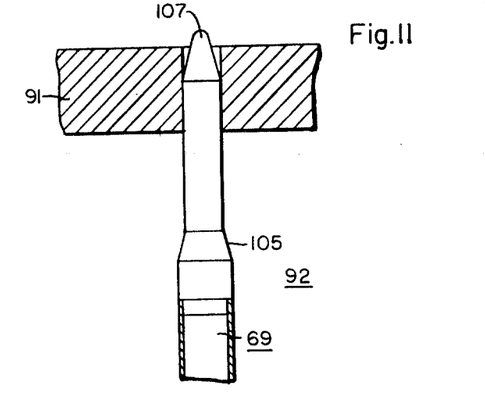
FIG. 11 is an enlarged fragmentary view of the top tie rod securing means.

FIG. 11 provides a detailed view of securing means for the top end of the tie rod 69. Tie rod 69 is fitted with a zirconium alloy end plug 105 having a generally pointed end 107. The end plug 105 fits through a channel 109 in the top nozzle or end plate 91. This arrangement allows the tie rod to move freely in a longitudinal direction. Since the tie rod 69 and the fuel bundles 61 are both made of a zirconium alloy, they, as well as fuel support grid 65, will expand at the same rate and hence there will be little fretting or wear upon the fuel elements from the grid finger springs of the grid 65.

The second grid assemblies 111 provide structural rigidity for the enclosure 63. These grids are desirably constructed of stainless steel or inconel or any other material having desirable nuclear properties and having a coefficient of thermal expansion comparable to that of the enclosure 63. Grids 111 are similar in construction to the fuel support grid 65 except that they are formed to avoid contact with the fuel elements or tie rods. More particularly, grid 111 has a lattice configuration but is provided with no spring fingers as in grid 65.

Since grid 111 provides no support for the fuel elements it is not necessary, as in the fuel support grid 65, to provide a separate cell for each fuel rod within its lattice configuration. More particularly, in the preferred embodiment of the invention, four fuel rods pass through each lattice cell of grid 111 compared with one rod per cell through the illustrative embodiment of fuel support grid 65. With fewer lattice members, less parasitic material is contained within the reactive region. Also, this arrangement will provide less of an obstruction to the passage of the coolant through the reactor.

Figure 12:
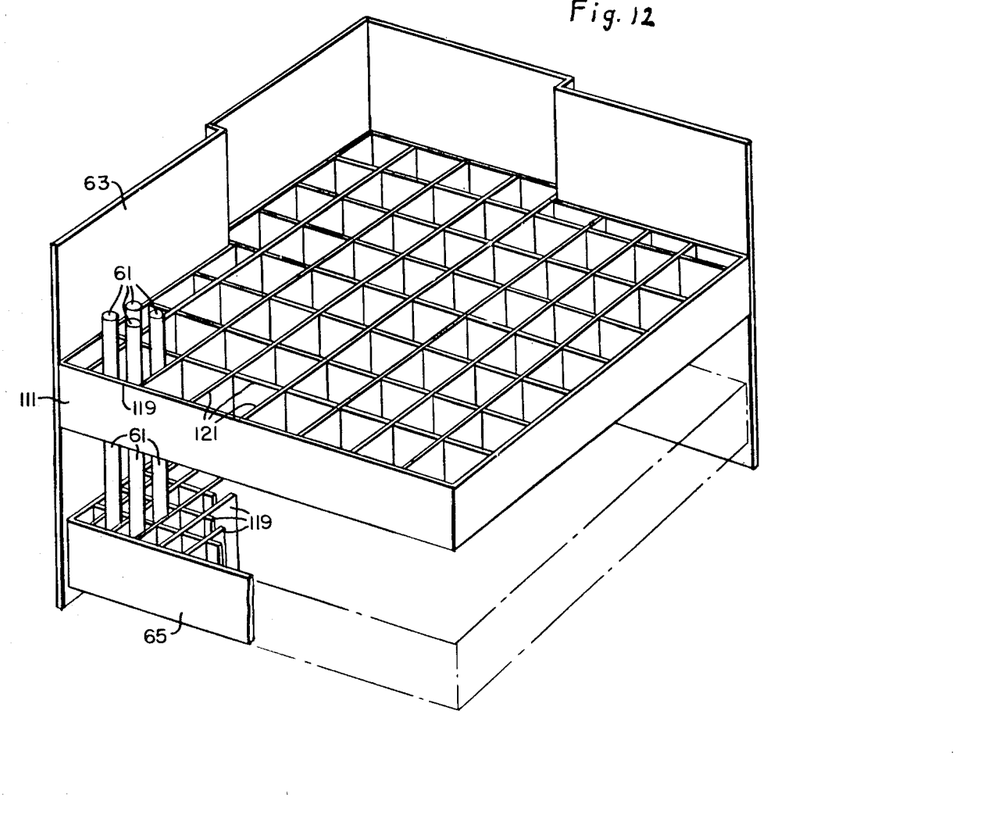
FIG. 12 is a perspective view of the two grid assemblies in FIG. 8.

The relationship of the fuel support grid 65, grid 111, and the enclosure 63 may be better observed by reference to FIG. 12. Fuel support grid 65 is supported by tie rods (not shown) and does not contact the enclosure 63. The enclosure stiffening grid 111 is secured to the stainless steel enclosure 63 along 115. Since the grid 111 has the same coefficient of thermal expansion as the enclosure 63, the grids 111 may be fastened to the enclosure by suitable means as by spot welding.

As already stated the main purpose of the grid 111 is to provide support for the stainless steel enclosure 63. However, these grids also provide for additional flow mixing of the coolant, usually water, circulating through the fuel assemblies. The grid 111 is located in close proximity with the fuel support grid 65 in order to assure the cross-sectional dimension of the enclosure in the vicinity of the fuel support grid 65, thus assuring that binding does not occur during periods of thermally-induced movement.

It is also to be understood that one, two, or more, of the support grid and fuel assembly grid assemblies may be provided along the length of the fuel rod clusters, even though only one such combination has been described herein.

Additionally, the inconel fuel support grid 65 can be fitted relatively close to the stainless steel enclosure 63 during handling and construction. Clearance for slipping is assured during operation of the reactor at elevated temperatures since the stainless steel grids expand faster than the inconel grids. That is, the expansion of the grid 111 will be greater than that of grid 65 and hence will provide greater separation between the grid 65 and the enclosure 63 at reactor operating temperatures.

While there have been shown and described what are of present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. A fuel assembly for use in nuclear reactor comprising:
    a. a plurality of generally elongated fuel elements;
    b. a generally thin-walled fuel enclosure formed from a zirconium base alloy surrounding and essentially coextensive with the fuel elements;
    c. a plurality of fuel support grid assemblies formed from a material selected from the group consisting of nickel base alloys and iron base alloys having good spring qualities under radiation, said assemblies positioned within said enclosure to maintain the fuel elements in a generally fixed spaced relationship but allowing for longitudinal movement of the fuel elements resulting from thermal expansion;
    d. each said fuel support grid assembly including a plurality of resilient and outwardly extending mounting tabs located around the periphery of said grid assembly; and
    e. a retaining means contacting said mounting tabs and metallurgically bonded to said thin-walled fuel enclosure for fixedly supporting said grid assemblies.

2. A fuel assembly as in claim 1
    a. wherein each fuel support grid assembly includes a plurality of mounting tabs located around its periphery; each mounting tab having an aperture therein; and b. wherein the fuel support grid assembly securing means includes buttons of a zirconium base alloy inserted through the apertures of the mounting tabs, respectively, the buttons being welded to the fuel enclosure so as to fixedly secure the grid assembly to the fuel enclosure.

3. A fuel assembly as in claim 2 wherein the mounting tabs are resilient and extend outwardly of the periphery of the grid assembly and resiliently engage the enclosure thereby permitting expansion of the grid assembly relative to the fuel enclosure during periods of thermal transients within the reactor.

4. A fuel assembly as in claim 1 further comprising
 a. a plurality of mounting tabs located around the upper and lower peripheries of each grid assembly; and
 b. upper and lower mounting straps formed from the same material as the enclosure, said mounting straps having periodically raised portions to allow for insertion of the respective mounting tabs, and being secured to the enclosure along the non-raised portions thereof.

5. A fuel assembly as in claim 4 wherein the mounting tabs are resilient and extend outwardly of the periphery of the grid assembly and resiliently engage the enclosure thereby permitting expansion of the grid assembly relative to the fuel enclosure during periods of thermal transients within the reactor.

6. A fuel assembly for use in a nuclear reactor comprising:
 a. a plurality of generally elongated fuel elements;
 b. a stainless steel fuel enclosure surrounding and essentially coextensive with said fuel elements;
 c. a plurality of enclosure stiffening grids having a lattice shaped configuration and forming a plurality of openings through which each fuel element passes, said fuel elements being spaced apart from and disjoined to the openings of the stiffening grid;
 d. a plurality of fuel support grids each comprising a generally lattice-shaped frame having a plurality of resilient means extending therefrom frictionally engaging the fuel elements respectively, said support grids being spaced from the enclosure;
 e. means for securing each enclosure stiffening grid to the fuel enclosure to give support thereto; and
 f. spacing means engaging each fuel support grid to longitudinally space said support grids.

7. A fuel assembly as in claim 6 wherein each fuel element passes through an opening in the lattice of each stiffening grid and is spaced from the sides thereof.

8. A fuel assembly of claim 6 including:
 a. a top end plate;
 b. a bottom end plate;
 c. means for securing the upper end of the fuel enclosure structure to the top end plate and the lower end of the fuel enclosure structure to the bottom end plate;
 d. a plurality of elongated tie rods passing through the stiffening grids and the fuel support grids;
 e. means for securing the ends of tie rods to the upper and lower plate end
 f. means for securing the fuel support grids to the tie rods.

9. A fuel assembly as in claim 8 wherein at least some of the tie rods comprise clad short length fuel rods mounted in tandem and coupled at the fuel support grids by elongated solid end plugs.

10. A fuel assembly as in claim 1 having a stainless steel top nozzle plate secured to the upper portion of the fuel enclosure; and having a stainless steel bottom nozzle plate secured to the lower portion of the fuel enclosure.

11. A fuel assembly as in claim 9 further comprising top and bottom nozzles including top and bottom nozzle plates respectively, each having generally flanged outer peripheries and having a plurality of channels located therein; and a plurality of flanged buttons fitted therethrough in abutted relationship with the enclosure and spot welded thereto.

12. A fuel assembly as in claim 2 wherein the fuel enclosure includes a bar located in each corner thereof and extending the length of the enclosure, and means securing the bars to the enclosure.

13. A fuel assembly as in claim 12 wherein the bars are notched along the side adjacent the fuel enclosure wall in the vicinity of the grid assembly to permit the placement of the grid lattice.

* * * * *